(12) United States Patent
Chen

(10) Patent No.: US 6,937,466 B2
(45) Date of Patent: Aug. 30, 2005

(54) PANEL FOR COMPUTER ENCLOSURE AND METHOD FOR FORMING SAME

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 216 days.

(21) Appl. No.: 10/461,590

(22) Filed: Jun. 13, 2003

(65) Prior Publication Data

US 2004/0052043 A1 Mar. 18, 2004

(30) Foreign Application Priority Data

Sep. 13, 2002 (TW) ...................................... 91214417 U

(51) Int. Cl.[7] .................................................. G07G 1/16
(52) U.S. Cl. ...................... 361/683; 361/748; 361/755; 312/223.2; 312/265.5; 211/13.1
(58) Field of Search ................................ 361/683, 727, 361/748, 755, 788, 796, 798, 801; 312/223.1, 223.2, 265.5, 265.6, 216, 293.3; 211/13.1, 26, 41.17; 174/35 R, 35 GC, 50, 50.51, 50.52, 66, 67

(56) References Cited

U.S. PATENT DOCUMENTS

| | | | | |
|---|---|---|---|---|
| 5,317,483 A | * | 5/1994 | Swindler | ..................... 361/801 |
| 5,936,835 A | * | 8/1999 | Astier | ......................... 361/683 |
| 6,058,025 A | * | 5/2000 | Ecker et al. | ................. 361/816 |
| 6,160,712 A | * | 12/2000 | Itai et al. | ..................... 361/759 |
| 6,182,835 B1 | * | 2/2001 | Chen | ......................... 211/13.1 |
| 6,231,139 B1 | * | 5/2001 | Chen | ......................... 312/223.2 |
| 6,480,392 B1 | * | 11/2002 | Jiang | ........................ 361/755 |
| 6,480,393 B1 | * | 11/2002 | Chen | ......................... 361/759 |
| 6,487,070 B2 | * | 11/2002 | Gan | .......................... 361/683 |
| 6,655,761 B2 | * | 12/2003 | Chen | ...................... 312/223.2 |
| 2002/0039277 A1 | * | 4/2002 | Zhou et al. | ................. 361/683 |

FOREIGN PATENT DOCUMENTS

TW 438201 5/2001

* cited by examiner

Primary Examiner—Michael Datskovskiy
(74) Attorney, Agent, or Firm—Wei Te Chung

(57) ABSTRACT

A rear panel (1) of a computer enclosure for covering a rear part of a computer enclosure includes a base (10) and four brims (20). The base defines a plurality of parallel expansion slots (108) for receipt of expansion cards of the enclosure. The base comprises a support plate (114) integrally extending therefrom in a first direction for securing the expansion cards. The brims extend from respective edges of the base. Each of the brims comprises an inner wall (202) extending from the base in the first direction and an outer wall (206) extending in a second direction opposite to the first direction for attaching the panel to the computer enclosure. The base and the inner walls of the brims cooperatively define a cavity for receiving one or more components thereat.

11 Claims, 4 Drawing Sheets

PANEL FOR COMPUTER ENCLOSURE AND METHOD FOR FORMING SAME

BACKGROUND OF THE INVENTION

1. Field of the Invention

The present invention relates to external panels of computer enclosures, and particularly to a rear panel for covering a rear part of a computer enclosure.

2. Prior Art

A conventional rear panel of a computer enclosure typically comprises a rear wall and a rear window frame. The rear wall and the rear window frame are manufactured separately. The rear wall defines a fixing opening whose shape corresponds with that of the rear window frame. A plurality of parallel slots is defined in the rear window frame, for receipt of expansion cards thereat. The rear window frame is mounted to the rear wall at the fixing opening with screws or rivets. Because the rear window frame is separately manufactured and then secured to the rear wall, this assembly process is necessarily painstaking and time-consuming. In addition, a strength of the rear panel as a whole is reduced.

FIG. 4 shows a conventional rear panel 1' directed to overcoming the above problems. The rear panel 1' is integrally made from a flat metal sheet. An opening 2' and a plurality of slots 3' are directly stamped from the rear panel 1'. A bent plate 4' is stamped outwardly from the rear panel 1' at corresponding ends of the expansion slots 3', thus defining a longitudinal slot 5' in the rear panel 1'. Because the rear panel 1' is integrally made from a single metal sheet, this saves on materials and simplifies the manufacturing process. However, because the rear panel 1' is substantially planar, heads of connectors (not shown) that are mounted to the rear panel 1' protrude outwardly from the computer enclosure. The heads are prone to be accidentally bumped and thereby loosened or damaged.

An improved rear panel of a computer enclosure which overcomes the above-mentioned problems is desired.

BRIEF SUMMARY OF THE INVENTION

Accordingly, an object of the present invention is to provide a panel for covering a part of a computer enclosure such as a rear part thereof.

Another object of the present invention is to provide a panel of a computer enclosure which has a simple structure and high overall strength.

A further object of the present invention is to provide a panel of a computer enclosure which can protect electronic components such as connectors from damage.

To achieve the above-mentioned objects, a rear panel of the present invention comprises a rectangular base and four brims. The base defines a plurality of parallel expansion slots for receipt of expansion cards of the enclosure. A support plate is bent in a first direction from the base at corresponding ends of the expansion slots. The rear panel is integrally made from a flat metal sheet. The sheet comprises a body and four wings extending outwardly from edges of the body. The body of the sheet is formed to the base of the rear panel. The wings are bent several times to form the four brims respectively. Each brim comprises an inner wall, a connecting wall and an outer wall. The inner walls of the brims are formed by perpendicularly bending the wings at respectively first crimp lines in the first direction. The connecting walls of the brims are formed by perpendicularly bending respective remaining unbent parts of the wings outwardly at respectively second crimp lines. The outer walls of the brims are formed by perpendicularly bending respective remaining unbent parts of the wings at respective third crimp lines in a second direction opposite to the first direction. A cavity is thereby cooperatively defined between the base and the brims, for accommodating the support plate and receiving heads of connectors mounted in the base.

Other objects, advantages and novel features of the present invention will be drawn from the following detailed description of a preferred embodiment of the present invention with the attached drawings, in which:

DETAILED DESCRIPTION OF THE INVENTION

Figure 1:
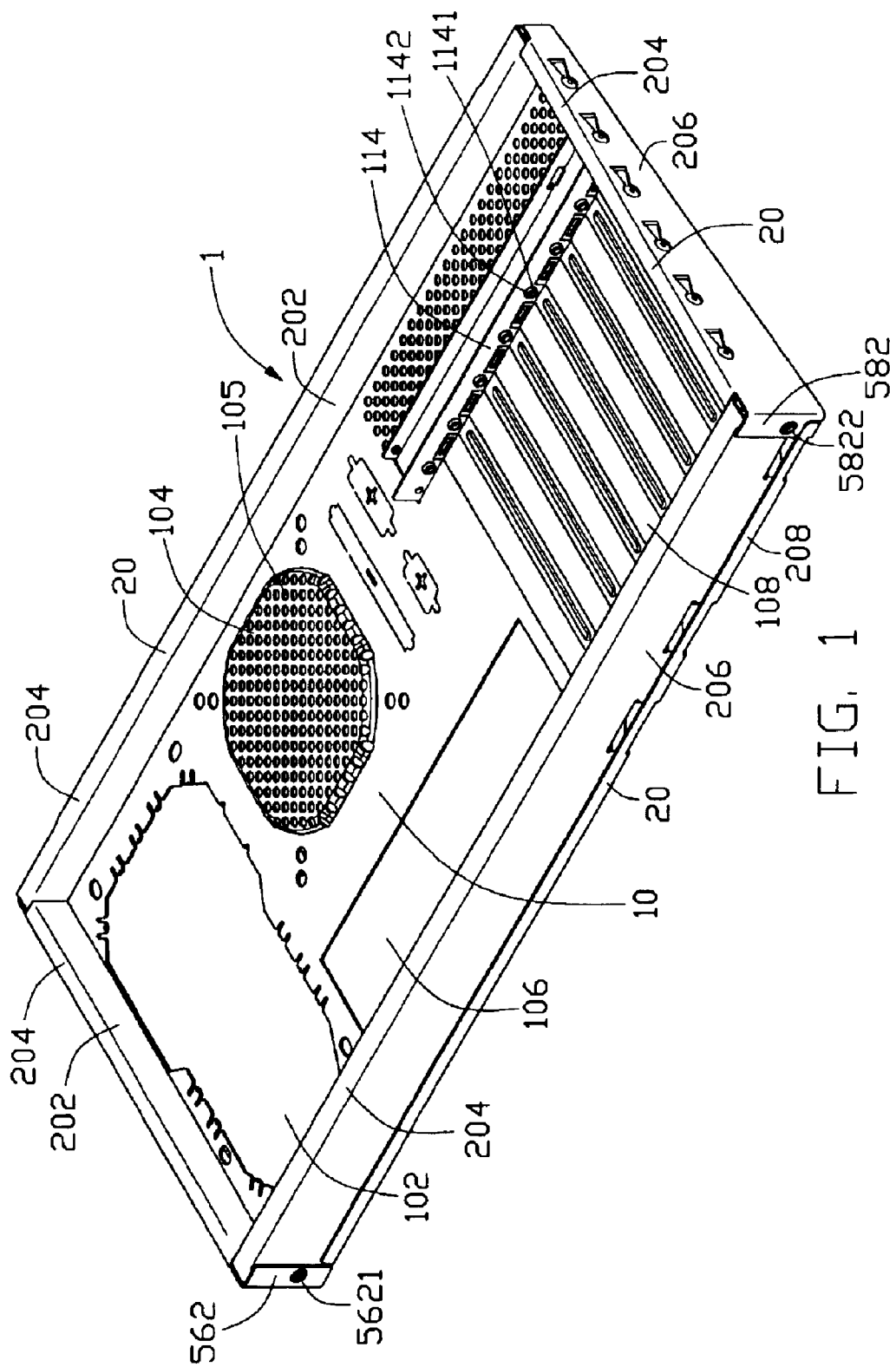
FIG. 1 is an isometric view of a rear panel of a computer enclosure in accordance with the present invention.
Figure 2:
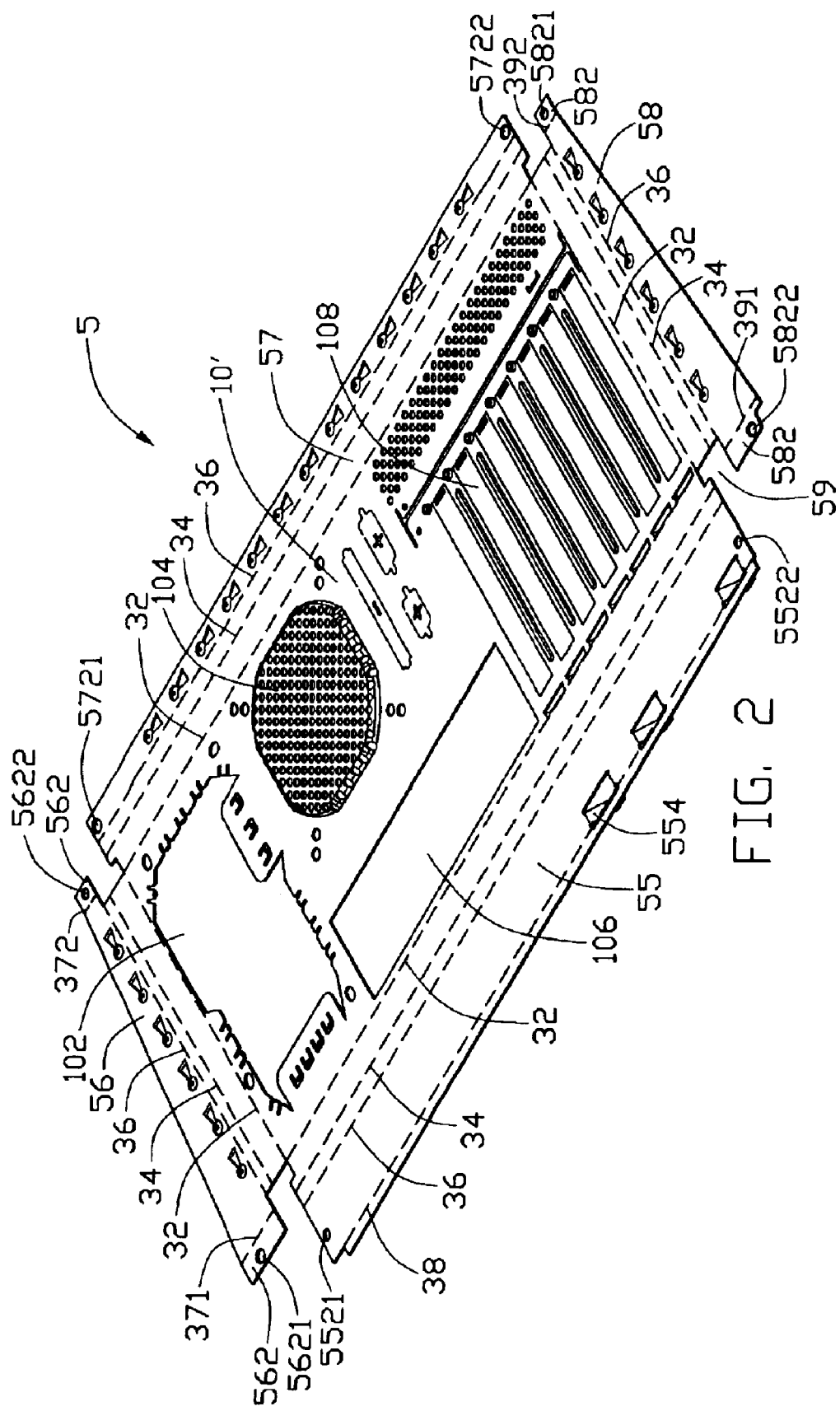
FIG. 2 is an isometric view of a precursor flat metal sheet for the rear panel of FIG. 1.
Figure 3:
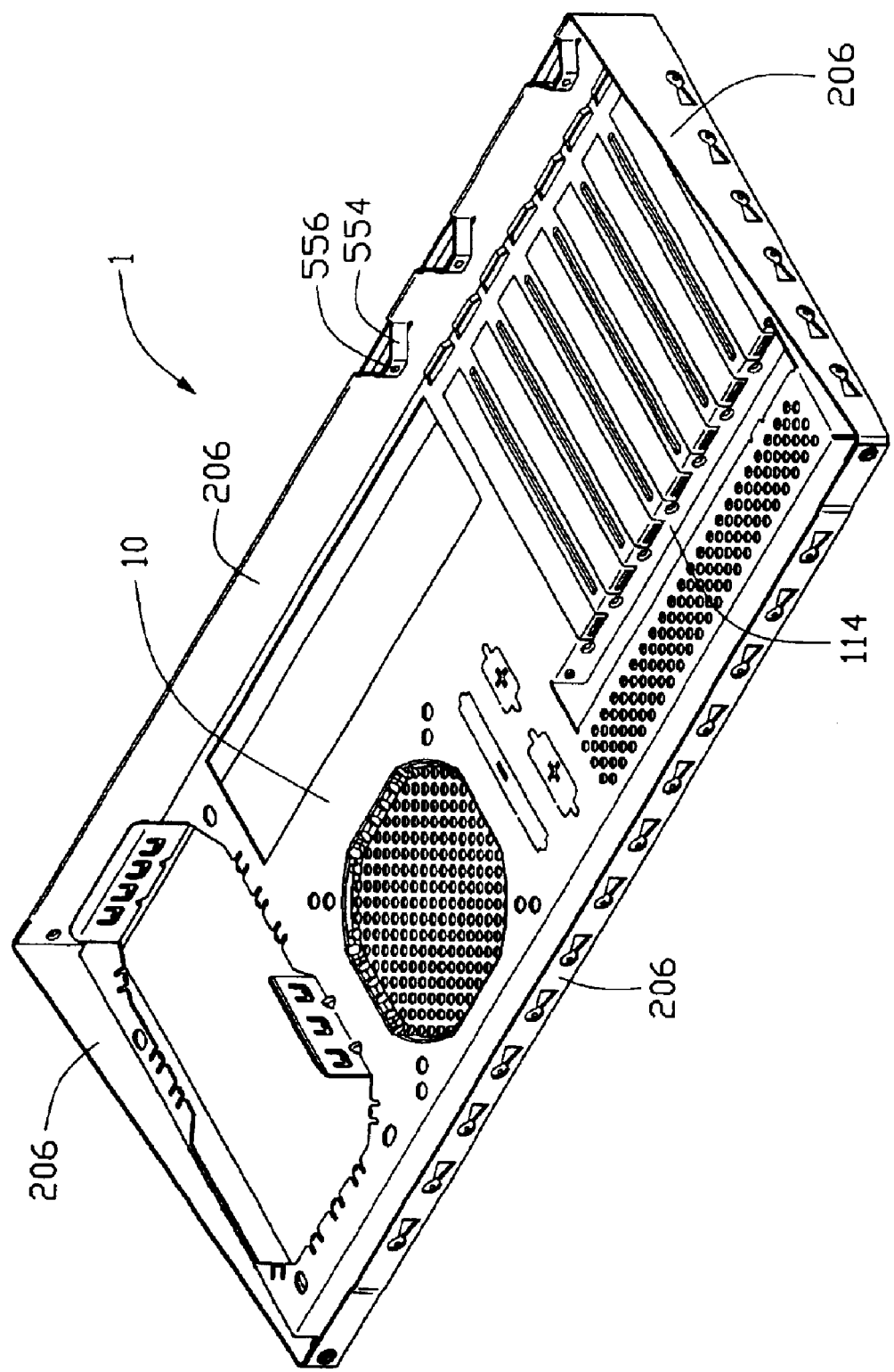
FIG. 3 is similar to FIG. 1, but showing the rear panel inverted.
Figure 4:
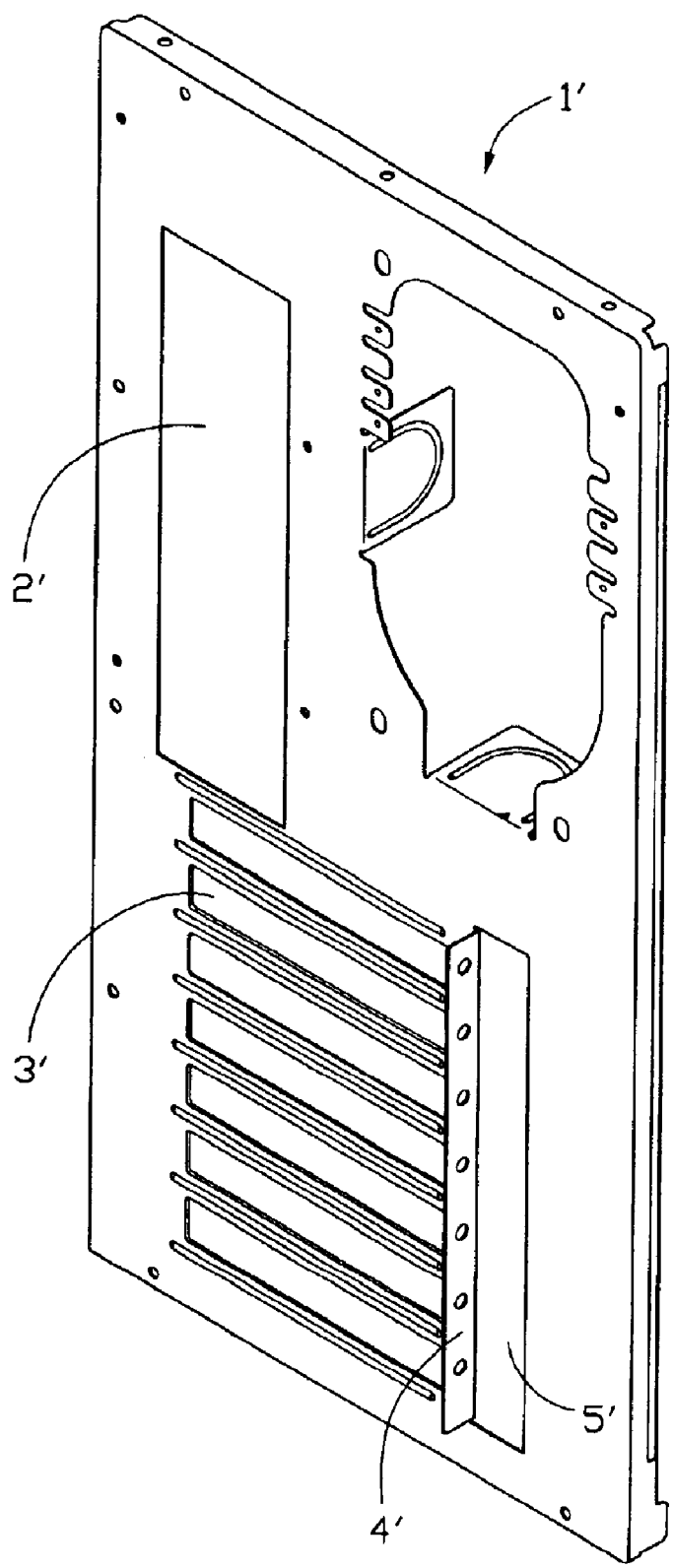
FIG. 4 is an isometric view of a conventional rear panel of a computer enclosure.

Referring to FIGS. 1–3, a rear panel 1 for a computer enclosure in accordance with a preferred embodiment of the present invention comprises a rectangular base 10, and four brims 20 extending in a first direction from four respective sides of the base 10.

An opening 102 is defined in a top portion of the base 10, for exposure of a power supply (not shown) accommodated in the computer enclosure (not shown). A heat dissipating area 104 is formed on the base 10 below the opening 102. The heat dissipating area 104 defines a plurality of heat dissipating vents 105. A longitudinal window 106 is defined in the base 10 below the opening 102, adjacent the heat dissipating area 104. The window 106 accommodates heads of connectors (not shown) extended therethrough. A plurality of parallel expansion slots 108 is defined in a lower portion of the base 10, for receipt of expansion cards (not shown) thereat. A longitudinal support plate 114 is bent perpendicularly in the first direction from the base 10 at corresponding ends of the expansion slots 108. A plurality of protrusions 1141 is formed on the support plate 114, with a screw hole 1142 being defined in each protrusion 1141. The protrusions 1141 are for securing slot covers (not shown) of the expansion cards over the expansion slots 108.

The rear panel 1 is integrally made from a flat metal sheet 5. The sheet comprises a main body 10', and four wings 55, 56, 57, 58 extending outwardly from four edges of the body 10' respectively. The body 10' is formed into the base 10 of the rear panel 1. The wings 55, 57 are elongate and rectangular. The wings 56, 58 are short, trapezoid-shaped, and arranged symmetrically relative to each other. The flat metal sheet 5 is thus shaped like an isosceles trapezoid. An L-shaped groove 59 is defined between every two adjacent of the wings 55, 56, 57, 58, for avoiding interference between the wings 55, 56, 57, 58 when they are bent. A pair of fixing portions 562 is defined at opposite sides of the short wing 56 respectively. A pair of fixing portions 582 is defined at opposite sides of the short wing 58 respectively. Fixing holes 5621, 5622 are defined in the fixing portions 562 respectively. Fixing holes 5821, 5822 are defined in the fixing portions 582 respectively. Fixing holes 5521, 5721 are defined at top ends of the elongate wings 55, 57 respectively, corresponding to the fixing holes 5621, 5622 of the short wing 56 respectively. Fixing holes 5522, 5722 are defined at bottom ends of the elongate wings 55, 57 respectively, corresponding to the fixing holes 5822, 5821 of the short wing 58 respectively. A plurality of aligned mounting standoffs 554 is stamped from a long outer edge portion of the elongate wing 55. Each mounting standoff 554 defines a mounting hole 556 therein (see FIG. 3). A plurality of aligned grounding tabs (not labeled) is formed on each of the wings 56, 57, 58.

The wings 55, 56, 57, 58 are bent several times to form the four brims 20 respectively. Each brim 20 comprises an inner wall 202, a connecting wall 204, and an outer wall 206. The outer wall 206 of the brim 20 corresponding to the wing 55 is wider than the outer wall 206 of the opposite brim 20 corresponding to the wing 57. A width of the outer wall 206 of each of the brims 20 corresponding to the wings 56, 58 progressively varies from a width substantially the same as a width of the outer wall 206 corresponding to the wing 55 to a width substantially the same as a width of the outer wall 206 corresponding to the wing 57. Said wider outer wall 206 of the brim 20 extends from its connecting wall 204 beyond the base 10. The mounting standoffs 554 are located on a part of said wider outer wall 206 that extends beyond the base 10.

The inner walls 202 of the brims 20 are formed by perpendicularly bending the wings 55, 56, 57, 58 at respective first crimp lines 32 (shown as dashed lines in FIG. 2) in the first direction. The connecting walls 204 of the brims 20 are formed by perpendicularly bending respective remaining unbent parts of the wings 55, 56, 57, 58 at respective second crimp lines 34 (shown as dashed lines in FIG. 2). The outer walls 206 of the brims 20 are formed by perpendicularly bending respective remaining unbent parts of the wings 55, 56, 57, 58 at respective third crimp lines 36 (shown as dashed lines in FIG. 2) in a second direction that is opposite to the first direction. Thus, the brim forms an inward through structure along the periphery of the base. A hem plate 208 of the wing 55 is formed by bending a remaining unbent part of the wing 55 180° at a fourth crimp line 38 (shown as dashed lines in FIG. 2), so that the hem plate 208 is doubled over the wing 55. Thus a bottom of the brim 20 corresponding to the wing 55 has a smooth, rounded profile. The fixing portions 562 of the wing 56 are bent perpendicularly at respective fifth and sixth crimp lines 371, 372 (shown as dashed lines in FIG. 2), so that the fixing portions 562 closely abut top ends of the wings 55, 57 respectively. The fixing portions 582 of the wing 58 are bent perpendicularly at respective seventh and eighth crimp lines 391, 392 (shown as dashed lines in FIG. 2), so that the fixing portions 582 closely abut bottom ends of the wings 55, 57 respectively. Thus, the fixing holes 5521, 5721, 5522, 5722 are aligned with the corresponding fixing holes 5621, 5622, 5822, 5821 respectively. Fasteners such as rivets are extended through respective pairs of corresponding fixing holes to secure the brims 20 together. A cavity (not labeled) is thereby cooperatively defined between the base 10 and the brims 20, for accommodating the support plate 114 and for receiving the heads of the connectors (not shown). The rear panel 1 can be secured to a rear part of the computer enclosure via the mounting holes 556 of the mounting standoffs 554.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel for covering one part of a computer enclosure, comprising:
   a base defining a plurality of parallel expansion slots for receipt of expansion cards of the enclosure, the base comprising a support plate integrally extending therefrom in a first direction for securing the expansion cards; and
   a plurality of brims extending from respective edges of the base, each of the brims comprising an inner wall extending from the base in the first direction and an outer wall extending in a second direction opposite to the first direction for attaching the panel to the computer enclosure, the base and the inner walls of the brims cooperatively defining a cavity for receiving one or more components thereat.

2. The panel as described in claim 1, wherein the base is rectangular, and the brims comprise two parallel short brims at transverse edges of the base, and two parallel long brims at longitudinal edges of the base.

3. The panel as described in claim 2, wherein each of the brims further comprises a connecting wall interconnecting a corresponding inner wall and a corresponding outer wall, the connecting wall being perpendicular to the inner wall and the outer wall.

4. The panel as described in claim 3, wherein the outer wall of one of the long brims is wider than the outer wall of the other long brim, and the outer wall of each of the short brims progressively varies from a width substantially the same as a width of the outer wall of said one of the long brims to a width substantially the same as a width of the outer wall of said other long brim.

5. The panel as described in claim 4, wherein said wider outer wall of the long brim extends beyond the base in the second direction, and a plurality of mounting parts is formed on said wider outer wall of the long brim for mounting the panel to the computer enclosure.

6. The panel as described in claim 5, wherein a fixing portion is provided at each of opposite ends of each of the short brims, and each of the fixing portions defines a fixing hole therein.

7. The panel as described in claim 6, wherein each of opposite ends of each of the long brims defines a fixing hole, the fixing holes of the long brims respectively corresponding to the fixing holes of the short brims.

8. A one piece panel structure for covering a rear portion of a computer, comprising:
   a base defining a main plane with at least one opening, a plurality of parallel expansion card slots, and a plurality of ventilation holes therein; and
   a plurality of outward brims formed along a periphery of said base, said brims generally defining U-shaped cross-sections each including spaced inner and outer walls linked by a connecting wall under a condition that the inner wall is connected to the periphery of the base, wherein
   the base is inwardly offset from the connecting wall along a direction perpendicular to said main plane, and inward through structures are formed along the periphery of the base due to said brims.

9. The panel structure as described in claim 8, wherein said inner walls of said brims are similar while some of the outer walls of said brims are different from one another, thus resulting in a wedge configuration of the brims from a side view.

10. The panel structure as described in claim 8, wherein an elongated support plate is formed on the base along ends of said expansion card slots, and extends in a same direction as said brims.

11. A one piece panel structure stamped and formed from sheet metal for covering a rear portion of a computer, comprising:

a base defining a main plane with at least one opening, a plurality of parallel expansion card slots, and a plurality of ventilation holes therein; and a plurality of outward brims formed along a periphery of said base, each of said brims generally including spaced inner and outer walls under a condition that the inner wall is connected to the periphery of the base, and the inner walls of the brims are essentially of a same height while the outer walls of the brims are of different heights wherein the outer walls of the brims located on the two lateral sides of the base define sloping configurations, wherein the base is inwardly offset from the brims along a direction perpendicular to said main plane.

* * * * *